US010999002B2

(12) United States Patent
Zhou et al.

(10) Patent No.: US 10,999,002 B2
(45) Date of Patent: May 4, 2021

(54) METHOD AND APPARATUS FOR DETERMINING MODULATION AND CODING SCHEME

(71) Applicant: BEIJING XIAOMI MOBILE SOFTWARE CO., LTD., Beijing (CN)

(72) Inventors: Juejia Zhou, Beijing (CN); Yajun Zhu, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 43 days.

(21) Appl. No.: 16/607,718

(22) PCT Filed: Apr. 24, 2017

(86) PCT No.: PCT/CN2017/081685
§ 371 (c)(1),
(2) Date: Oct. 23, 2019

(87) PCT Pub. No.: WO2018/195720
PCT Pub. Date: Nov. 1, 2018

(65) Prior Publication Data
US 2020/0136747 A1    Apr. 30, 2020

(51) Int. Cl.
*H04W 72/04*     (2009.01)
*H04L 1/00*       (2006.01)
*H04L 5/00*       (2006.01)

(52) U.S. Cl.
CPC .......... *H04L 1/0003* (2013.01); *H04L 1/0026* (2013.01); *H04L 5/0057* (2013.01); *H04W 72/0413* (2013.01)

(58) Field of Classification Search
None
See application file for complete search history.

(56) References Cited

U.S. PATENT DOCUMENTS

2015/0117568 A1*  4/2015  Wang ................... H04L 5/1453
                                                         375/298
2015/0200746 A1   7/2015  Pan et al.
(Continued)

FOREIGN PATENT DOCUMENTS

CN       101771505 A       7/2010
CN       102480761 A       5/2012
(Continued)

OTHER PUBLICATIONS

ISA State Intellectual Property Office of the People's Republic of China, International Search Report Issued in Application No. PCT/CN2017/081685, dated Jan. 15, 2018, WIPO, 4 pages.

*Primary Examiner* — Anh Vu H Ly
(74) *Attorney, Agent, or Firm* — Syncoda LLC; Feng Ma

(57) ABSTRACT

A method of determining a modulation and coding scheme includes: acquiring UCI transmitted by UE, the UCI including at least a CQI index; determining whether the CQI index belongs to a CQI compression index representing at least two modulation and coding schemes; when the CQI index belongs to the CQI compression index, determining a modulation and coding scheme represented by the CQI compression index according to preset CQI compression index indication information; and determining modulation and coding configuration information for the UE according to the modulation and coding scheme, and transmitting the modulation and coding configuration information to the UE. By adopting the method of determining the modulation and coding scheme, a higher-order modulation and coding scheme may be configured for the UE based on a relevant CQI index to reduce calculation amount during analyzing the modulation and coding scheme.

20 Claims, 11 Drawing Sheets

(56) References Cited

U.S. PATENT DOCUMENTS

| | | |
|---|---|---|
| 2015/0372784 A1 | 12/2015 | Xu et al. |
| 2015/0381310 A1* | 12/2015 | Hammarwall ...... H04W 72/082 370/329 |
| 2019/0260501 A1* | 8/2019 | Kim ................ H04L 1/0026 |

FOREIGN PATENT DOCUMENTS

| | | |
|---|---|---|
| CN | 102792656 A | 11/2012 |
| CN | 103580788 A | 2/2014 |
| CN | 103944855 A | 7/2014 |
| CN | 104202115 A | 12/2014 |
| WO | 2015114544 A1 | 8/2015 |

* cited by examiner

METHOD AND APPARATUS FOR DETERMINING MODULATION AND CODING SCHEME

CROSS-REFERENCE TO RELATED APPLICATION

The application is a national stage of International Application No. PCT/CN2017/081685 filed on Apr. 24, 2017, the disclosure of which is incorporated herein by reference in its entirety.

TECHNICAL FIELD

The present disclosure relates to the field of communication technology, and in particular, to a method and an apparatus for determining a modulation and coding scheme.

BACKGROUND

In an LTE (Long-Term Evolution) system, a base station needs to determine a channel condition according to CQI (channel quality indication) information fed back by UE (user equipment), and then configures an appropriate modulation and coding scheme for the UE according to the channel condition. In the related art, the UE feeds back downlink channel quality with any of CQI indexes, from 0 to 15, represented by 4-bit data in an uplink control signaling. In a CQI table, the CQI index reflects channel quality of four modulation and coding schemes: QPSK, 16 QAM, 64 QAM, and 256 QAM.

With the development of wireless communication technologies, mobile communication network is gradually evolving toward 5G network. The 5G network has greatly improved its ability in data transmission rate, coverage, latency, capacity and other aspects. In a case where the channel condition is good, the base station may configure a higher-order modulation and coding scheme such as 1024 QAM and 2048 QAM for the UE to improve the data transmission throughput of a channel. In a case of increasing the modulation and coding schemes, if the above 16 CQI indexes are still used to reflect the channel condition, channel condition reflection granularity of a single index is inevitably increased, resulting in a decrease in feedback accuracy of an original coding scheme corresponding to channel quality, thereby reducing accuracy of determining a modulation and coding scheme.

SUMMARY

In order to overcome the problems existing in the related art, a method and apparatus of determining a modulation and coding scheme are provided by examples of the present disclosure, so as to configure a higher-order modulation and coding scheme for UE based on a relevant CQI index.

According to a first aspect of examples of the present disclosure, a method of determining a modulation and coding scheme is provided, the method being applied to a base station, and including:

acquiring uplink control information (UCI) transmitted by user equipment (UE), where the UCI includes at least a channel quality indication (CQI) index;

determining whether the CQI index belongs to a CQI compression index representing at least two modulation and coding schemes;

when the CQI index belongs to the CQI compression index, determining a modulation and coding scheme represented by the CQI compression index according to preset CQI compression index indication information; and determining modulation and coding configuration information for the UE according to the modulation and coding scheme, and transmitting the modulation and coding configuration information to the UE;

where the preset CQI compression index indication information includes: a correspondence between the CQI compression index and the at least two modulation and coding schemes, and a CQI compression index representation manner corresponding to each modulation and coding scheme.

Optionally, prior to acquiring the UCI transmitted by the UE, the method further includes:

transmitting CQI compression index configuration information to the UE, where the CQI compression index configuration information includes: the CQI compression index, the at least two modulation and coding schemes represented by each CQI compression index, and the CQI compression index representation manner corresponding to each modulation and coding scheme.

Optionally, the UCI further includes: an equipment identifier of the UE;

determining whether the CQI index belongs to the CQI compression index representing the at least two modulation and coding schemes includes:

determining whether the UE supports a CQI index compression function according to the equipment identifier of the UE; and when the UE supports the CQI index compression function, determining whether the CQI index belongs to the CQI compression index according to the preset CQI compression index indication information.

Optionally, whether the CQI index belongs to the CQI compression index is determined in any of the following:

when the UCI received includes preset compression indication information, determining that the CQI index in the UCI belongs to the CQI compression index;

when the UCI includes preset scrambled information, determining that the CQI index in the UCI belongs to the CQI compression index; and when the UCI is received by using preset uplink time-frequency resources, determining that the CQI index in the UCI belongs to the CQI compression index.

Optionally, determining the modulation and coding scheme represented by the CQI compression index according to the preset CQI compression index indication information includes:

determining the modulation and coding scheme represented by the CQI compression index according to a value of the compression indication information.

Optionally, determining the modulation and coding scheme represented by the CQI compression index according to the preset CQI compression index indication information includes:

descrambling the scrambled information in the UCI according to a preset scrambling code to determine a target scrambling code and the CQI compression index; and determining the modulation and coding scheme represented by the CQI compression index according to the target scrambling code.

Optionally, determining the modulation and coding scheme represented by the CQI compression index according to the preset CQI compression index indication information includes:

determining a target time-frequency resource location for acquiring the UCI; and determining the modulation and coding scheme represented by the CQI compression index according to the target time-frequency resource location.

According to a second aspect of examples of the present disclosure, a method of determining a modulation and coding scheme is provided, the method being applied to UE, and including:

determining a to-be-requested modulation and coding scheme according to measured downlink channel quality;

querying a preset CQI table according to the to-be-requested modulation and coding scheme to determine a target CQI index; and when the target CQI index belongs to a CQI compression index representing at least two modulation and coding schemes, transmitting the CQI compression index to a base station with preset CQI compression index indication information, so that the base station configures a modulation and coding scheme for the UE according to the CQI compression index.

Optionally, the CQI compression index is transmitted to the base station with the preset CQI compression index indication information in any of the following:

setting a value of a reserved bit in UCI to a value corresponding to the to-be-requested modulation and coding scheme, and transmitting the value to the base station;

using a scrambling code corresponding to the to-be-requested modulation and coding scheme to scramble the UCI, and transmitting the scrambled UCI to the base station; and using a target uplink time-frequency resource specified for the to-be-requested modulation and coding scheme to transmit the UCI to the base station;

where the UCI includes the CQI compression index.

Optionally, the method further includes:

acquiring CQI compression index configuration information, where the CQI compression index configuration information includes: the CQI compression index, the at least two modulation and coding schemes represented by each CQI compression index, and a CQI compression index representation manner corresponding to each modulation and coding scheme.

According to a third aspect of examples of the present disclosure, an apparatus for determining a modulation and coding scheme is provided, the apparatus being disposed in a base station, and including:

a UCI acquisition module, configured to acquire UCI transmitted by UE, where the UCI including at least a CQI index;

a determination module, configured to determine whether the CQI index belongs to a CQI compression index representing at least two modulation and coding schemes;

a coding scheme determination module, configured to, when the CQI index belongs to the CQI compression index, a modulation and coding scheme represented by the CQI compression index according to preset CQI compression index indication information; and a transmission module, configured to determine modulation and coding configuration information for the UE according to the modulation and coding scheme, and transmit the modulation and coding configuration information to the UE;

where the preset CQI compression index indication information includes: a correspondence between the CQI compression index and the at least two modulation and coding schemes, and a CQI compression index representation manner corresponding to each modulation and coding scheme.

Optionally, the apparatus further includes:

a configuration information transmission module, configured to transmit CQI compression index configuration information to the UE where the CQI compression index configuration information includes: the CQI compression index, the at least two modulation and coding schemes represented by each CQI compression index, and the CQI compression index representation manner corresponding to each modulation and coding scheme.

Optionally, the UCI further includes an equipment identifier of the UE, and the determination module includes:

a first determination sub-module, configured to determine whether the UE supports a CQI index compression function according to the equipment identifier of the UE; and a second determination sub-module, configured to determine w whether the CQI index belongs to the CQI compression index according to the preset CQI compression index indication information when the UE supports the CQI index compression function.

Optionally, the coding scheme determination module includes any of the following compression index determination units:

a first compression index determination unit, configured to determine that the CQI index in the UCI belongs to the CQI compression index when the UCI received includes preset compression indication information;

a second compression index determination unit, configured to determine that the CQI index in the UCI belongs to the CQI compression index when the UCI includes preset scrambled information; and a third compression index determination unit, configured to determine that the CQI index in the UCI belongs to the CQI compression index when the UCI is received by using preset uplink time-frequency resources.

Optionally, the coding scheme determination module further includes:

a first coding determination unit, configured to determine the modulation and coding scheme represented by the CQI compression index according to a value of the compression indication information.

Optionally, the coding scheme determination module further includes:

a scrambling code determination unit, configured to descramble the scrambled information in the UCI according to a preset scrambling code to determine a target scrambling code and the CQI compression index; and a second coding determination unit, configured to determine the modulation and coding scheme represented by the CQI compression index according to the target scrambling code.

Optionally, the coding scheme determination module further includes:

a location determination unit, configured to determine a target time-frequency resource location for acquiring the UCI; and a third coding determination unit, configured to determine the modulation and coding scheme represented by the CQI compression index according to the target time-frequency resource location.

According to a fourth aspect of examples of the present disclosure, an apparatus for determining a modulation and coding scheme is provided, the apparatus being disposed in UE, and including:

a coding scheme request module, configured to determine a to-be-requested modulation and coding scheme according to measured downlink channel quality;

a CQI index determination module, configured to query a preset CQI table according to the to-be-requested modulation and coding scheme to determine a target CQI index; and a CQI index transmission module, configured to transmit, when the target CQI index belongs to a CQI compression index representing at least two modulation and coding schemes, the CQI compression index to a base station with preset CQI compression index indication information, so that the base station configures a modulation and coding scheme for the UE according to the CQI compression index.

Optionally, the CQI index transmission module includes:

a first transmission sub-module, configured to set a value of a reserved bit in UCI to a value corresponding to the to-be-requested modulation and coding scheme, and transmit the value to the base station;

a second transmission sub-module, configured to use a scrambling code corresponding to the to-be-requested modulation and coding scheme to scramble the UCI, and transmit the scrambled UCI to the base station; and a third transmission sub-module, configured to use a target uplink time-frequency resource specified for the to-be-requested modulation and coding scheme to transmit the UCI to the base station;

where the UCI includes the CQI compression index.

Optionally, the apparatus further including:

a configuration information acquisition module, configured to acquire CQI compression index configuration information, where the CQI compression index configuration information includes: the CQI compression index, the at least two modulation and coding schemes represented by each CQI compression index, and a CQI compression index representation manner corresponding to each modulation and coding scheme.

According to a fifth aspect of examples of the present disclosure, a non-transitory computer readable storage medium having computer instructions stored thereon is provided, where the instructions are executed by a processor to perform operations of the methods according to the first aspect.

According to a sixth aspect of examples of the present disclosure, a non-transitory computer readable storage medium having computer instructions stored thereon is provided, where the instructions are executed by a processor to perform operations of the methods according to the second aspect.

According to a seventh aspect of examples of the present disclosure, an apparatus for determining a modulation and coding scheme is provided, including: a processor; and a memory for storing processor executable instructions, where the processor is configured to:

acquire UCI transmitted by UE, where the UCI includes at least a CQI index;

determine whether the CQI index belongs to a CQI compression index representing at least two modulation and coding schemes;

when the CQI index belongs to the CQI compression index, determine a modulation and coding scheme represented by the CQI compression index according to preset CQI compression index indication information; and determine modulation and coding configuration information for the UE according to the modulation and coding scheme, and transmit the modulation and coding configuration information to the UE;

where the preset CQI compression index indication information includes: a correspondence between the CQI compression index and the at least two modulation and coding schemes, and a CQI compression index representation manner corresponding to each modulation and coding scheme.

According to an eighth aspect of examples of the present disclosure, an apparatus for determining a modulation and coding scheme is provided, including: a processor; and a memory for storing processor executable instructions, where the processor is configured to:

determine a to-be-requested modulation and coding scheme according to measured downlink channel quality;

query a preset CQI table according to the to-be-requested modulation and coding scheme to determine a target CQI index;

when the target CQI index belongs to a CQI compression index representing at least two modulation and coding schemes, transmit the CQI compression index to a base station with preset CQI compression index indication information, so that the base station configures a modulation and coding scheme for the UE according to the CQI compression index.

The technical solutions provided by the examples of the present disclosure may realize the following beneficial effects.

In the examples of the present disclosure, after acquiring the UCI transmitted by the UE, the base station first determines whether the CQI index included in the UCI belongs to the CQI compression index. If the CQI index belongs to the CQI compression index, the base station may accurately analyze a modulation and coding scheme represented by the CQI compression index according to a compression index representation manner. If the CQI index received by the base station does not belong to the compression index, the base station determines a target modulation and coding scheme based on the CQI index according to the related art. Since the probability that the base station receives the CQI compression index is relatively small, the method of determining the modulation and coding scheme provided by the present disclosure is used to effectively indicate a high-order modulation and coding scheme in a preset CQI compression index indication information based on the CQI index specified by the related art. On the basis that no calculation amount of analyzing CQI feedback information by the base station is increased and no precision of reflecting the modulation and coding scheme by conventional CQI index is lowered, a higher-order modulation and coding scheme may be configured for the UE, so that in a case where a channel condition is good, data transmission throughput is effectively increased, data transmission efficiency of the UE in a 5G communication system is enhanced, and user experience for the UE is improved.

It should be understood that the above general description and the following detailed description are only exemplary and explanatory, and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
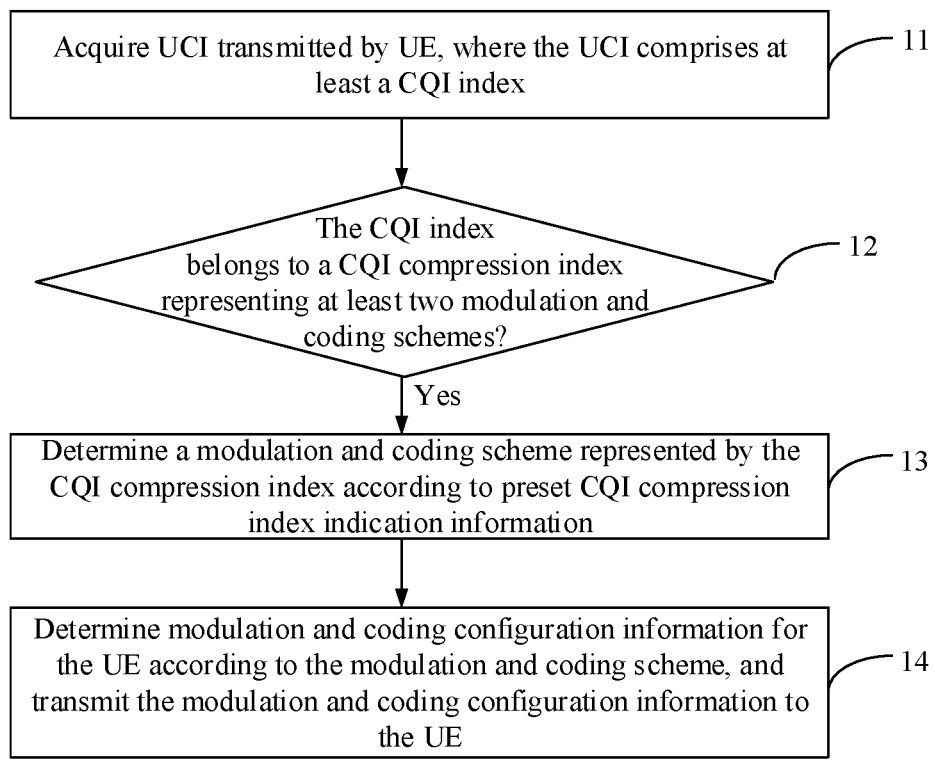
FIG. 1 is a flowchart illustrating a method of determining a modulation and coding scheme according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

The technical solution provided by the present disclosure is applicable to an LTE system of a communication network of 5G and above. Execution subjects involved in the present disclosure include: a base station and UE. The base station may be a base station, a sub-base station, or the like, which may be provided with a large-scale antenna array. The UE may be a user terminal, a user node, a mobile terminal, a tablet computer or the like. In a specific implementation process, the base station and the UE are independent of and in contact with each other to jointly implement the technical solutions provided by the present disclosure.

In application scenarios of the present disclosure, modulation and coding schemes that the base station may configure for the UE are not limited to four modulation and coding schemes: QPSK, 16 QAM, 64 QAM, and 256 QAM, and further include higher-order modulation and coding schemes such as 1024 QAM and 2048 QAM. In order not to increase the amount of data occupied by a CQI index, 4-bit values, 0 to 15, are still used to quantize channel quality, and an appropriate modulation and coding scheme, especially the higher-order modulation and coding scheme, will be accurately allocated to the UE.

Based on the above application scenarios, a method of determining a modulation and coding scheme is provided by the present disclosure, which is applied to a base station. FIG. 1 is a flowchart illustrating a method of determining a modulation and coding scheme according to an example, which may include the following steps.

At step 11, uplink control information (UCI) transmitted by UE is acquired, where the UCI includes at least a CQI index.

Taking an LTE system of a 5G network as an example, a base station needs to determine a downlink channel condition according to a CQI index which represents quantized channel quality and is reported by UE, so as to configure a suitable modulation and coding scheme for the UE.

In the LTE system, the UE transmits a CQI index representing quantized downlink channel quality to the base station through the UCI. Specifically, indexes 0 to 15 are represented by 4 bits in an uplink control signaling.

At step 12, whether the CQI index belongs to a CQI compression index representing at least two modulation and coding schemes is determined.

According to a structure of the uplink control signaling, the base station may determine, according to information of the preset 4 bits in the uplink control signaling, whether the CQI index represented by the preset 4 bits belongs to a CQI compression index.

In examples of the present disclosure, a CQI index that may represent at least two modulation and coding schemes is referred to as the CQI compression index. A CQI table including CQI compression indexes is referred to as a new CQI table.

Illustratively, the new CQI table may be as shown in Table 1:

TABLE 1

| CQI index | Modulation | Code rate x 1024 | Efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 490 | 1.9141 |
| 6 | 16 QAM | 616 | 2.4063 |
| 7 | 64 QAM | 466 | 2.7305 |
| 8 | 64 QAM | 567 | 3.3223 |
| 9 | 64 QAM | 666 | 3.9023 |
| 10 | 64 QAM | 772 | 4.5234 |
| 11 | 64 QAM | 873 | 5.1152 |
| 12 | 256 QAM | 711 | 5.5547 |
| 13 | 256 QAM | 797 | 6.2266 |
| 14 | 256 QAM | 885 | 6.9141 |
| 15 | 256 QAM | 948 | 7.4063 |
| | 1024 QAM | xxx | x.xxxx |

In Table 1, CQI index 15 belongs to the CQI compression index and represents two modulation and coding schemes: 256 QAM and 1024 QAM.

In another example of the present disclosure, UCI received by the base station may further include: an equipment identifier of UE.

Since the UE may not support a CQI index compression function, for example, a 5G device supports the CQI index compression function, but 3G and 4G devices do not support the CQI index compression function, in a scenario where the base station communicates with 3G, 4G, and 5G UE simultaneously, the base station may first exclude the part which does not include a CQI compression index by using the equipment identifier of the UE, so as to speed up the detection of the CQI compression index.

Figure 2:
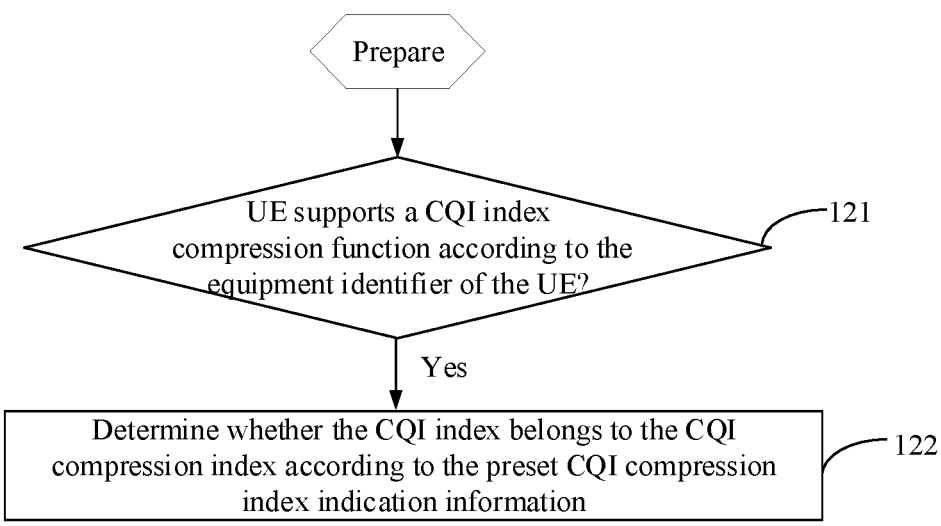
FIG. 2 is a flowchart illustrating another method of determining a modulation and coding scheme according to an example of the present disclosure.

FIG. 2 is a flowchart illustrating another method of determining a modulation and coding scheme according to an example. The step 12 may include:

At step 121, whether the UE supports a CQI index compression function is determined according to an equipment identifier of the UE; if the UE supports the CQI index compression function, subsequent step 122 is performed; otherwise, a modulation and coding scheme is analyzed according to the related art.

In examples of the present disclosure, the base station may be pre-configured with a correspondence between an equipment identifier of UE and index compression function indication information. Therefore, the base station may determine whether the UE supports the index compression function according to the equipment identifier of the UE. The equipment identifier of the UE may be information indicating a current network standard, which includes: 3G, 4G, 5G, and the like.

Since the 3G and 4G UE do not support the CQI index compression function, when the base station determines that the UE is 3G or 4G UE, it is determined that the equipment does not support the index compression function, and it may be accurately determined that the UCI does not include the CQI compression index.

If it is determined that current UE belongs to 5G UE according to the equipment identifier of the UE, it may be determined that the UE supports the index compression function.

At step 122, whether the CQI index belongs to the CQI compression index is determined according to preset CQI compression index indication information.

In examples of the present disclosure, even if it is determined that the current UE supports the CQI index compression function in step 121, the CQI index fed back by the UE is not necessarily the CQI compression index due to different downlink channel quality. This is because a higher-order modulation and coding scheme requires higher channel quality. In general, modulation and coding schemes of 256 QAM and higher shown in Table 1 may only appear partially in a scene with less interference, such as a micro base station or an indoor scene. In a macro network, medium modulation and coding schemes such as QPSK and 16 QAM are used more often. That is to say, there is a small probability for the UE requesting to use the high-order modulation and coding scheme 1024 QAM represented by index 15 in Table 1.

Therefore, in the case where it is determined that the UE, for example, the 5G device, supports the CQI index compression function, the base station still needs to further determine whether the CQI index belongs to the CQI compression index.

In the examples of the present disclosure, in the above step 12 or step 122, according to the preset CQI compression index indication information, the base station may determine that the CQI index transmitted by the UE belongs to the CQI compression index in at least one of the following manners.

The preset CQI compression index indication information is used to indicate that the UCI includes the CQI compression index. The preset CQI compression index indication information includes: a correspondence between the CQI compression index and at least two modulation and coding schemes, and a CQI compression index representation manner corresponding to each of the modulation and coding schemes.

A first compression index determination manner: if the received UCI includes preset compression indication information, determining that the CQI index in the UCI belongs to the CQI compression index.

Figure 3:
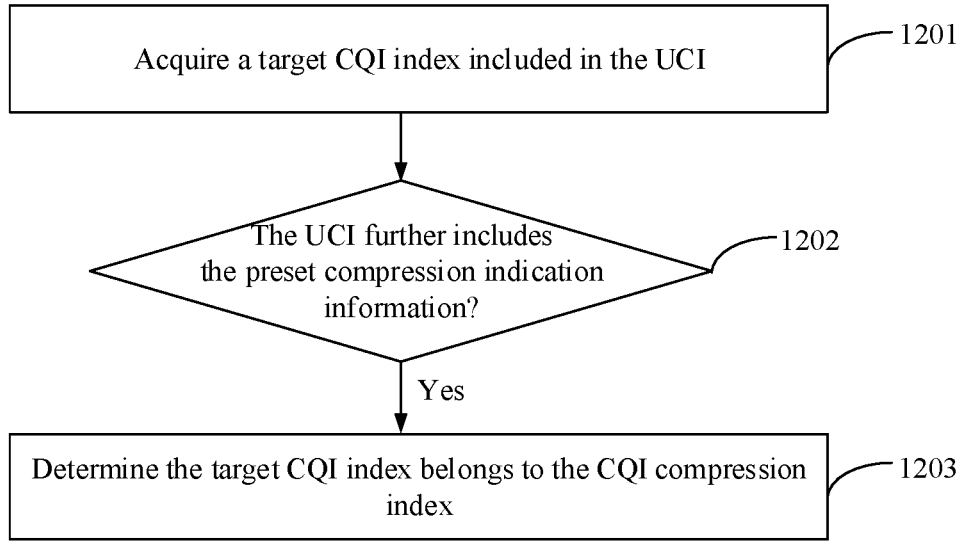
FIG. 3 is a flowchart illustrating another method of determining a modulation and coding scheme according to an example of the present disclosure.

FIG. 3 is a flowchart illustrating another method of determining a modulation and coding scheme according to an example. The above step 12 may include:

At step 1201, a target CQI index included in the UCI is acquired.

The base station may analyze the target CQI index from a preset field of an uplink control signaling according to a preset structure of the UCI.

At step 1202, it is determined whether the UCI further includes the preset compression indication information; if the UCI further includes the preset compression indication information, following step 1203 is performed; otherwise, it is determined that the target CQI index belongs to a conventional CQI index, and a corresponding modulation and coding scheme is analyzed according to the related art.

In examples of the present disclosure, the UCI transmitted by the UE may include, in addition to the CQI index, the preset compression indication information indicating that the CQI index belongs to the CQI compression index. For example, the preset compression indication information may be a reserved bit set in the uplink control signaling, such as, the $n^{th}$ bit in the uplink control signaling. If the $n^{th}$ bit is not set in the uplink control signaling, it is determined that the CQI index included in the UCI belongs to the conventional CQI index. Otherwise, step 1203 is executed.

At step 1203, it is determined that the target CQI index belongs to the CQI compression index.

As illustrated above, if the base station finds that the reserved bit, for example, the $n^{th}$ bit, is set in the uplink control signaling, it can be determined that the target CQI index included in the UCI belongs to the CQI compression index.

A second compression index determination manner: if the UCI includes scrambled information, determining that the CQI index in the control information belongs to the CQI compression index.

In another example of the present disclosure, the preset CQI compression index indication information may indicate that part or all of the UCI is scrambled so as to indicate that the UCI includes the CQI compression index.

After the base station acquires the UCI, if it is found that the UCI contains scrambled information, it may be determined that the UCI includes the CQI compression index.

A third compression index determination manner: if the UCI is received by using preset uplink time-frequency resources, determining that the CQI index in the UCI belongs to the CQI compression index.

In another example of the present disclosure, the preset CQI compression index indication information may indicate that the UE transmits the UCI by using a specified time-frequency resource, so as to indicate that the UCI includes the CQI compression index. If the base station acquires the UCI with the time-frequency resource at a specified location, it may be determined that the UCI includes the CQI compression index.

At step 13, when the CQI index belongs to the CQI compression index, a modulation and coding scheme represented by the CQI compression index is determined according to the preset CQI compression index indication information;

In examples of the present disclosure, after the base station determines that the CQI index included in the UCI belongs to the CQI compression index, since the preset CQI compression index indication information includes a CQI compression index representation manner corresponding to each of the modulation and coding schemes, it may be determined which modulation and coding scheme is represented by the CQI compression index according to the preset compression index indication information.

In the present disclosure, the base station may analyze a modulation and coding scheme represented by the CQI compression index in at least one of the following coding analyzing manner.

A first coding analyzing manner corresponds to the first compression index determination manner. The step 13 may include: determining a modulation and coding scheme represented by the CQI compression index according to a value of the compression indication information.

As shown in Table 1, assuming that the CQI compression index is index 15, the compression index 15 corresponds to two modulation and coding schemes: 256 QAM and 1024 QAM. The preset CQI compression index indication information includes: setting a 1-bit reserved bit in the UCI, such as the $n^{th}$ bit, for representing the compression indication information. If the $n^{th}$ bit is set to 0, the index 15 represents 256 QAM. If the $n^{th}$ bit is set to 1, the index 15 represents 1024 QAM.

Therefore, after the base station acquires the target CQI index, for example, index 15, included in the UCI according to step 1201, a modulation and coding scheme may be determined uniquely according to the value of the compression indication information.

Assuming that the value of the $n^{th}$ bit is 1, it may be determined that the CQI compression index 15 transmitted by the UE represents 1024 QAM. That is, the UE requests the base station to configure a 1024 QAM coding scheme for the UE.

Figure 4:
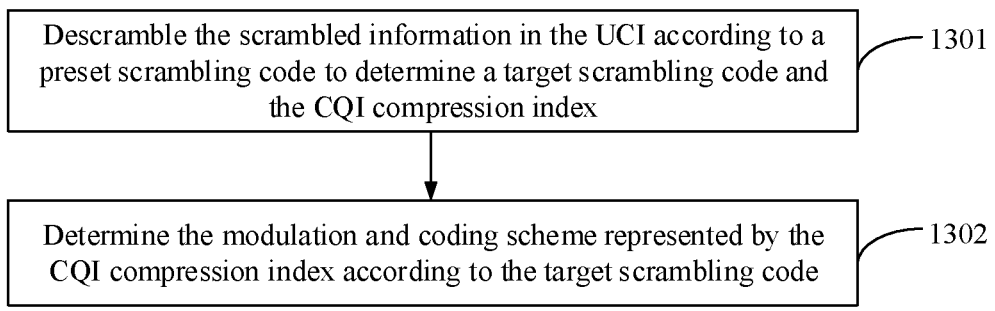
FIG. 4 is a flowchart illustrating another method of determining a modulation and coding scheme according to an example of the present disclosure.

A second coding analyzing manner corresponds to the second compression index determination manner. FIG. 4 is a flowchart illustrating another method of determining a modulation and coding scheme according to an example. The step 13 may include the following steps.

At step 1301, the scrambled information in the UCI is descrambled according to a preset scrambling code to determine a target scrambling code and the CQI compression index.

Still taking the two modulation and coding schemes corresponding to the index 15 in Table 1 as an example, the preset CQI compression index indication information may include: a correspondence among a CQI compression index, a modulation and coding scheme, and scrambling code information, illustratively as shown in Table 2:

TABLE 2

| CQI compression index | modulation and coding scheme | scrambling code information |
| --- | --- | --- |
| 15 | 256 QAM | scrambling code 1 |
|  | 1024 QAM | scrambling code 2 |

Table 2 illustratively shows two modulation and coding schemes represented by a CQI compression index, and a scrambling code corresponding to each of the modulation and coding schemes.

In examples of the present disclosure, the preset CQI compression index indication information may further include: scrambling all information or a preset partial information of the UCI, where the preset partial information may be a field carrying the CQI compression index in the UCI, which includes at least 4 bits, or may be other fields in the UCI.

In examples of the present disclosure, according to whether the scrambled information includes the CQI compression index, acquiring the CQI compression index includes the following two cases.

In a first case, the scrambled information does not include the CQI compression index.

In the above step 1301, the CQI compression index may be determined directly from a preset location of the UCI.

In a second case, the scrambled information includes the CQI compression index

That is to say, the scrambled information is acquired after information including the CQI compression index is scrambled.

Then, in step 1301, the scrambled information may be descrambled by using the two preset scrambling codes shown in Table 2 to acquire the CQI compression index and determine the target scrambling code.

At step 1302, a modulation and coding scheme represented by the CQI compression index is determined according to the target scrambling code.

Assuming that in the second case, if the base station uses scrambling code 2 to successfully descramble UCI transmitted by UE 1, it may be determined by querying Table 2 that a modulation and coding scheme requested by the UE 1 is 1024 QAM.

Figure 5:
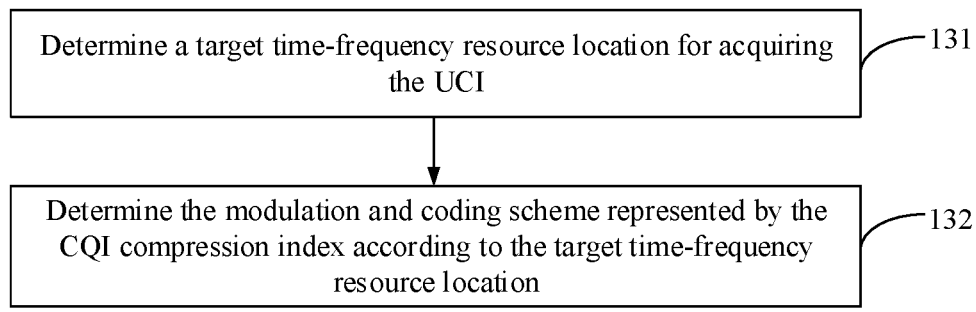
FIG. 5 is a flowchart illustrating another method of determining a modulation and coding scheme according to an example of the present disclosure.

A third coding analyzing manner corresponds to the third compression index determination manner. FIG. 5 is a flowchart illustrating another method of determining a modulation and coding scheme according to an example. The step 13 may include the following steps.

At step 131: a target time-frequency resource location for acquiring the UCI is determined.

In another example of the present disclosure, the preset CQI compression index indication information may appoint that different modulation and coding schemes corresponding to one CQI compression index are transmitted by using different designated uplink time-frequency resources.

Taking a frequency resource as an example, for UE with an operating bandwidth of 10 MHz, it is assumed that its operating frequency band is 800 MHz to 810 MHz. Still taking the CQI compression index being index 15 as an example, the preset CQI compression index indication information includes: a correspondence among a CQI compression index, two modulation and coding schemes, and two frequency resource information, illustratively as shown in Table 3:

TABLE 3

| CQI compression index | modulation and coding scheme | frequency information |
|---|---|---|
| 15 | 256 QAM | 800 MHz |
|  | 1024 QAM | 810 MHz |

At step 132, a modulation and coding scheme represented by the CQI compression index is determined according to the target time-frequency resource location.

As shown in Table 3, if the base station acquires the CQI compression index 15 through a carrier of 810 MHz, it may be known by querying Table 3 that the modulation and coding scheme requested by the UE 1 is 1024 QAM.

An analyzing process of distinguishing a plurality of modulation and coding schemes corresponding to one CQI compression index through time domain resources are similar to the previous description, and will not be described herein again.

If one CQI compression index corresponds to more modulation and coding schemes, a method of combining time-frequency resources may be used to perform compression index indication. For example, if the CQI compression index 15 corresponds to four modulation and coding schemes, which are respectively represented as: coding 1, coding 2, coding 3, and coding 4, the preset CQI compression index indication information includes: a correspondence among a CQI compression index, four modulation and coding schemes, two frequency resources, and two time domain resources, which may be as shown in Table 4:

TABLE 4

| CQI compression index | modulation and coding scheme | frequency information | time domain information |
|---|---|---|---|
| 15 | coding 1 | 800 MHz | time slot 1 |
|  | coding 2 | 810 MHz | time slot 1 |
|  | coding 3 | 800 MHz | time slot 2 |
|  | coding 4 | 810 MHz | time slot 2 |

In Table 4, when one CQI compression index 15 corresponds to the four modulation and coding schemes, it may be represented by using a combination of two frequency resources, e.g., 800 MHz and 810 MHz, and two time domain resources, e.g., time slot 1 and time slot 2, so as to reduce control signaling overhead.

According to acquired frequency domain location information and time domain location information of the CQI compression index, the base station may query the Table 4 to uniquely determine a modulation and coding scheme.

At step 14, modulation and coding configuration information is determined for the UE according to the modulation and coding scheme and is transmitted to the UE.

After the base station acquires a modulation and coding scheme requested by the UE, the base station determines the modulation and coding configuration information for the UE, and transmits the determined configuration information to the UE, so that the UE configures the modulation and coding scheme according to the modulation and coding configuration information.

Figure 6:
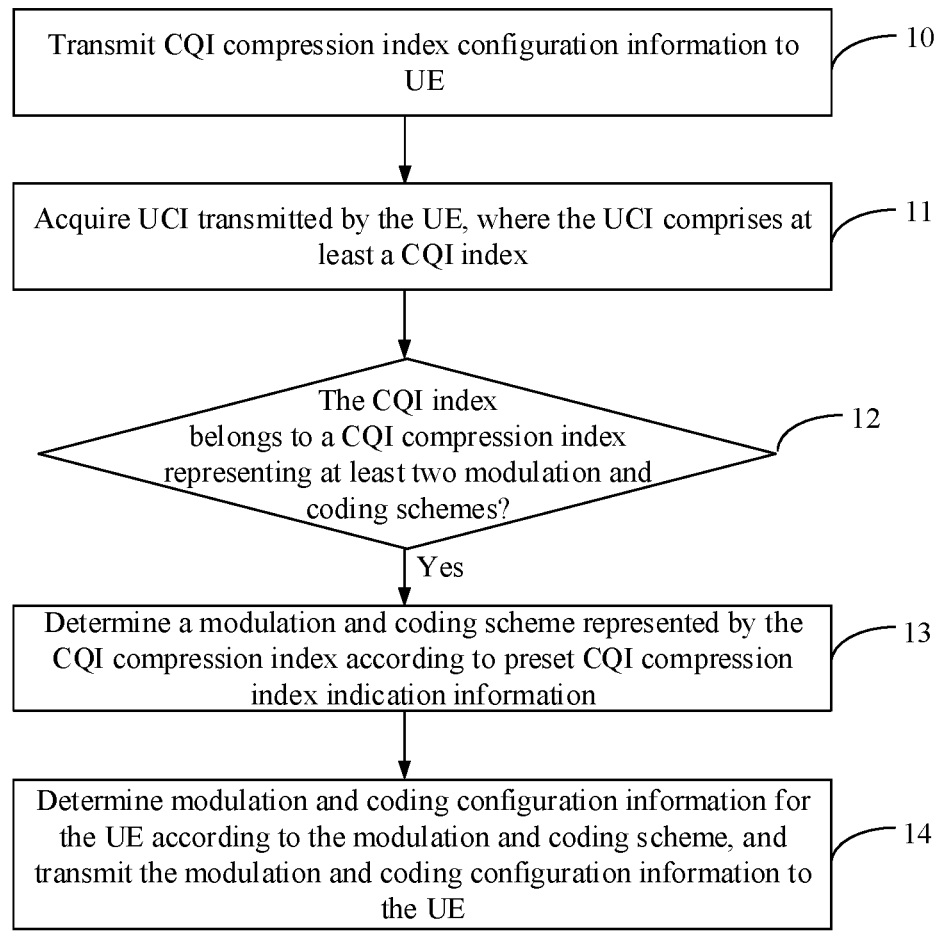
FIG. 6 is a flowchart illustrating another method of determining a modulation and coding scheme according to an example of the present disclosure.

The modulation and coding configuration information includes at least: an equipment identifier of the UE, and a modulation and coding scheme specified for the UE. When the base station specifies a modulation and coding scheme for the UE, the base station may specify the modulation and coding scheme for the UE completely according to the modulation and coding scheme requested by the UE. The base station may allocate a suitable modulation and coding scheme for the UE by taking the modulation and coding scheme requested by the UE as a reference FIG. 6 is a flowchart illustrating another method of determining a modulation and coding scheme according to an example. Before the above step 11, the method may further include:

At step 10, CQI compression index configuration information is transmitted to the UE, where the CQI compression index configuration information includes: a CQI compression index, at least two modulation and coding schemes corresponding to each CQI compression index, and a CQI compression index representation manner corresponding to each modulation and coding scheme.

As can be known from the above examples, the CQI compression index configuration information includes: a CQI compression index, and CQI compression index indication information of each CQI compression index.

In the present disclosure, if the new CQI table includes a plurality of CQI compression indexes, the CQI compression index configuration information includes: the CQI compression index indication information corresponding to each CQI compression index.

The above examples describe only a case where only one CQI compression index 15 is included in the CQI table as shown in Table 1. Accordingly, the preset CQI compression index indication information represents CQI compression index indication information corresponding to the CQI compression index 15. The present disclosure is not limited to this case.

The example of the present disclosure is applicable to a case where no CQI compression index configuration information is stored before the UE uses the CQI compression index for the first time. In this case, although the UE supports the CQI index compression function, the UE does not store a CQI table including a CQI compression index, for example the new CQI table as shown in Table 1, and indication information of each CQI compression index, e.g., the preset CQI compression index indication information.

The new CQI table including the CQI compression index or updated information in the new CQI table relative to the original CQI table in the related art to the UE may be transmitted to the UE in a broadcast or unicast manner by the base station. Thus, when determining that the downlink channel condition is good, the UE may use the CQI compression index to request the base station allocating a higher-order modulation and coding scheme for the UE, thereby improving data transmission throughput of a channel.

In the present disclosure, the base station may load the CQI compression index configuration information to a broadcast signaling, a signaling in upper layer RRC, or a signaling in a PDCCH (Physical Downlink Control Channel) of a physical layer, and transmit the information to the UE.

It should be noted that a number of modulation and coding schemes represented by one compression index in the new CQI table is not limited to two, and may be multiple. Accordingly, the CQI compression index indication manner corresponding to each modulation and coding scheme may also be extended.

In summary, by using the method of determining the modulation and coding scheme provided by the present disclosure, after acquiring the UCI, the base station first determines whether the CQI index included in the UCI belongs to the CQI compression index. If the CQI index belongs to the CQI compression index, the base station may accurately analyze a modulation and coding scheme represented by the CQI compression index according to a compression index representation manner. If the CQI index received by the base station does not belong to the compression index, the base station determines a target modulation and coding scheme based on the CQI index according to the related art. Since the probability that the base station receives the CQI compression index is relatively small, the method of determining the modulation and coding scheme provided by the present disclosure is used to effectively indicate a high-order modulation and coding scheme in a preset CQI compression index indication information based on the CQI index specified by the related art. Thus, the workload of the base station for analyzing CQI feedback information is effectively reduced, and a higher-order modulation and coding scheme may be configured for the UE, so that in a case where a channel condition is good, data transmission throughput is effectively increased, data transmission efficiency of the UE in a 5G communication system is enhanced, and user experience for the UE, for example, an eMBB (enhanced Mobile Broad Band) device, is improved.

Figure 7:
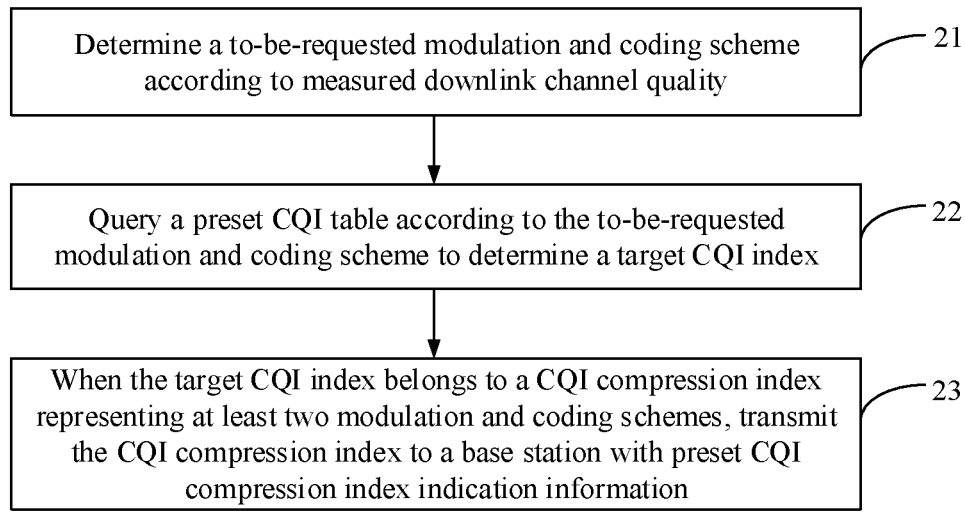
FIG. 7 is a flowchart illustrating a method of determining a modulation and coding scheme according to an example of the present disclosure.

Correspondingly, a method of determining a modulation and coding scheme is further provided by the present disclosure, which is applied to UE. FIG. 7 is a flowchart illustrating a method of determining a modulation and coding scheme according to an example. The method may include the following steps.

At step 21, a to-be-requested modulation and coding scheme is determined according to measured downlink channel quality.

Taking UE 1 as an example, the UE 1 may determine the downlink channel quality according to the reception condition of a downlink reference signal. Specifically, the UE 1 may query a preset CQI table according to measured code rate and efficiency of the downlink reference signal to determine a to-be-requested modulation and coding scheme. Illustratively, assuming that the code rate of the downlink reference signal determined by the UE 1 is xxx, and the efficiency thereof is x.xxxx, as can be known by querying the new CQI table shown in Table 1, its corresponding modulation and coding scheme is 1024 QAM. Therefore, the UE 1 may determine 1024 QAM as the to-be-requested modulation and coding scheme.

At step 22, a preset CQI table is queried according to the to-be-requested modulation and coding scheme to determine a target CQI index.

As illustrated above, the UE 1 queries the CQI table according to the determined modulation and coding scheme: 1024 QAM, and determines that the target CQI index is index 15.

At step 23, when the target CQI index belongs to a CQI compression index representing at least two modulation and coding schemes, the CQI compression index is transmitted to a base station with preset CQI compression index indication information.

In the present disclosure, the preset CQI table includes a CQI compression index, where the CQI compression index refers to a CQI index that may represent two or more modulation and coding schemes. For example, in the CQI table shown in Table 1, index 15 represents two modulation and coding schemes: 256 QAM and 1024 QAM. Therefore, index 15 belongs to the CQI compression index.

If the UE 1 transmits index 15 to the base station by using the related art, the base station cannot accurately analyze the modulation and coding scheme requested by the UE. Therefore, in the present disclosure, the UE is to transmit CQI index 15 to the base station with the preset CQI compression index indication information. The preset CQI compression index indication information is used to indicate a manner in which the CQI compression index is transmitted to explicitly inform the base station of a target modulation and coding scheme requested by the UE.

In examples of the present disclosure, preset CQI compression configuration information indicates that the UE may transmit the CQI compression index in at least one of the following manners:

Manner 1: a value of a reserved bit in UCI is set to a value corresponding to the to-be-requested modulation and coding scheme, and transmitted to the base station.

In an example of the present disclosure, the base station and the UE pre-appoint: setting a reserved bit in the UCI for indicating that the UCI includes a CQI compression index; and explicitly expressing each modulation and coding scheme according to the value of the reserved bit.

A number of the reserved bits is determined according to a number of modulation and coding schemes represented by a CQI compression index. Still taking the compression index 15 in the new CQI table as an example, since the compression index 15 represents two modulation and coding schemes, one reserved bit may be used to indicate different modulation and coding schemes. For example, when the reserved bit is set to 0, it represents 256 QAM; and when the reserved bit is set to 1, it represents 1024 QAM. Similarly, if one CQI compression index represents four modulation and coding schemes, two reserved bits may be used in the UCI to indicate different modulation and coding schemes.

In this way, the UCI transmitted by the UE 1 to the base station includes the CQI compression index 15 and one reserved bit, and the value of the one reserved bit is 1.

Manner 2: UCI is scrambled by using a scrambling code corresponding to the to-be-requested modulation and coding scheme, and the scrambled UCI is transmitted to the base station.

In an example of the present disclosure, the base station and the UE may pre-appoint: using an information scrambling manner to indicate that the UCI includes a CQI compression index, and using different scrambling codes to explicitly express respective modulation and coding schemes represented by the CQI compression index.

Illustratively, still taking the compression index 15 in the new CQI table as an example, since the compression index 15 represents two modulation and coding schemes, two scrambling codes may be used to represent different modulation and coding schemes, as shown in Table 2.

In this way, the UCI transmitted by the UE 1 to the base station includes the CQI compression index 15 and scrambled information, where the scrambled information acquired by scrambling through scrambling code 2.

Manner 3: UCI including the CQI compression index is transmitted to the base station by using a target uplink time-frequency resource specified for the to-be-requested modulation and coding scheme.

In an example of the present disclosure, the base station and the UE may pre-appoint: using time-frequency resources at different locations to transmit a CQI compression index to explicitly indicate respective modulation and coding schemes represented by the CQI compression index.

Assuming that one CQI compression index represents two modulation and coding schemes, two frequency resources within a frequency bandwidth may be specified to transmit the UCI respectively to explicitly indicate two modulation and coding schemes represented by the CQI compression index.

Still taking the UE 1 as an example, it is assumed that the bandwidth of the UE 1 is 10 MHz, and corresponding frequency band is: 800 MHz to 810 MHz. According to the CQI compression configuration information, if the to-be-requested modulation and coding scheme is 256 QAM, the UCI is transmitted through a carrier of 800 MHz. If the to-be-requested modulation and coding scheme is 1024 QAM, the UCI is transmitted through a carrier of 810 MHz.

In this way, because the to-be-requested modulation and coding scheme determined by the UE 1 is 1024 QAM, the UCI is transmitted through the carrier of 810 MHz.

Similarly, it is also possible to appoint that different time domain resources are used to transmit the UCI, or in a case where one CQI compression index represents more modulation and coding schemes, a combination of time domain and frequency domain is used to explicitly indicate different modulation and coding schemes represented by one CQI compression index.

Figure 8:
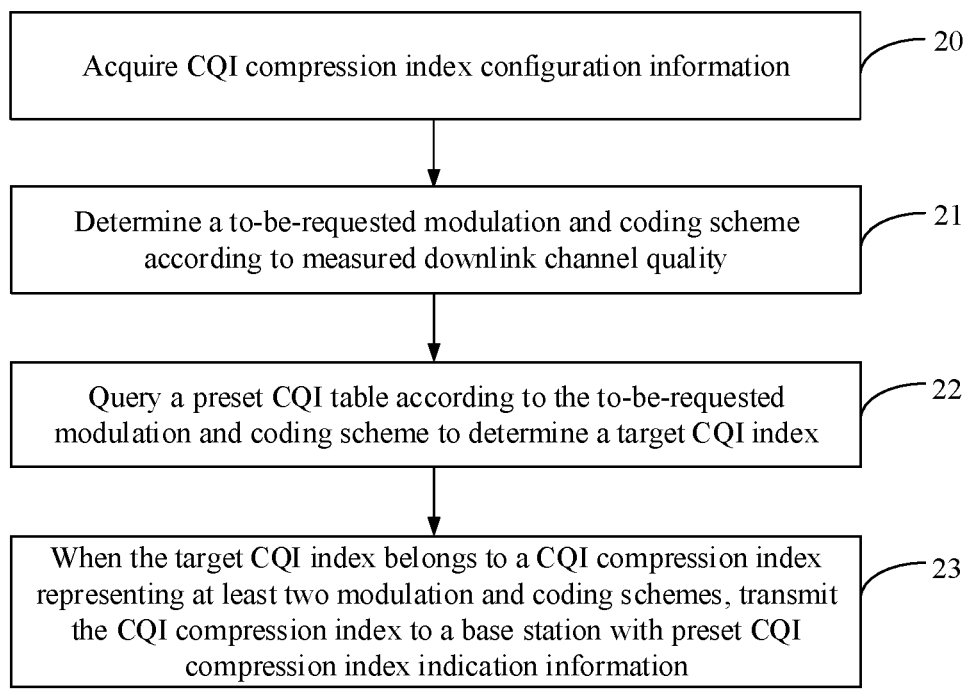
FIG. 8 is a flowchart illustrating another method of determining a modulation and coding scheme according to an example of the present disclosure.

FIG. 8 is a flowchart illustrating a method of determining a modulation and coding scheme according to an example. On the basis of the example shown in FIG. 7, the method may further include:

At step 20, CQI compression index configuration information is acquired, where the CQI compression index configuration information includes: a CQI compression index, at least two modulation and coding schemes represented by each of the CQI compression index, and a CQI compression index representation manner corresponding to each of the modulation and coding schemes.

That is to say, the CQI compression index configuration information includes: one or more CQI compression indexes, and CQI index compression indication information corresponding to each of the CQI compression indexes.

The step 20 may be set before step 21 or step 22.

It is assumed that the UE belongs to a device that supports a CQI index compression function, but does not acquire a CQI table containing a compression index and CQI compression index indication information. In this case, if the UE needs to request a high-order modulation and coding scheme represented by one CQI compression index, the UE needs to acquire the CQI compression configuration information first, and then perform the step 23 or steps 21-23.

It can be seen that when the UE requests a higher-order modulation and coding scheme from the base station through a CQI index, without adding a new CQI index, it is only to use the CQI index compression function on the basis of the original CQI indexes, 0 to 15, to transmit the CQI index with a preset CQI compression index indication manner, so that it is possible to accurately request the base station allocating a required modulation and coding scheme. Since the number of CQI indexes is not increased, CQI feedback burden of the UE is not increased.

For the simplicity of description, all the foregoing method examples are expresses as a combination of a series of actions. However, those skilled in the art are to be aware of that the present disclosure is not limited by the sequence of the described actions, because according to the present disclosure, some steps may be performed in alternative sequences or at the same time.

Also, those skilled in the art are also to be aware of that the examples described in the specification are all optional examples, and the actions and modules involved are not necessarily required by the present disclosure.

Corresponding to the method examples for realizing application functions, the present disclosure also provides apparatus examples for realizing the application functions and corresponding terminal examples.

Figure 9:
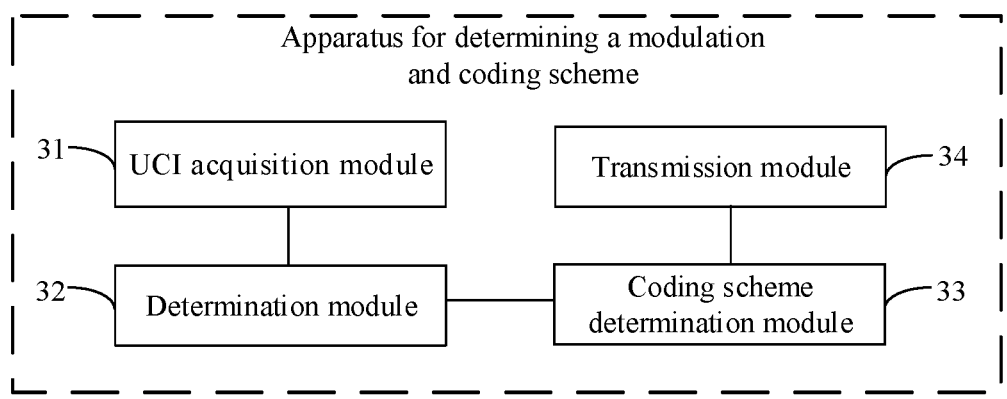
FIG. 9 is a block diagram illustrating an apparatus for determining a modulation and coding scheme according to an example of the present disclosure.

FIG. 9 is a block diagram showing an apparatus for determining a modulation and coding scheme according to an example, which is disposed in a base station. The apparatus may include:

a UCI acquisition module 31 configured to acquire UCI transmitted by UE, where the UCI including at least a CQI index;

a determination module 32 configured to determine whether the CQI index belongs to a CQI compression index representing at least two modulation and coding schemes;

a coding scheme determination module 33 configured to determine, when the CQI index belongs to the CQI compression index, a modulation and coding scheme represented by the CQI compression index according to preset CQI compression index indication information; and a transmission module 34 configured to determine modulation and coding configuration information for the UE according to the modulation and coding scheme, and transmit the modulation and coding configuration information to the UE;

where the preset CQI compression index indication information includes: a correspondence between the CQI compression index and the at least two modulation and coding schemes, and a CQI compression index representation manner corresponding to each modulation and coding scheme.

Figure 10:
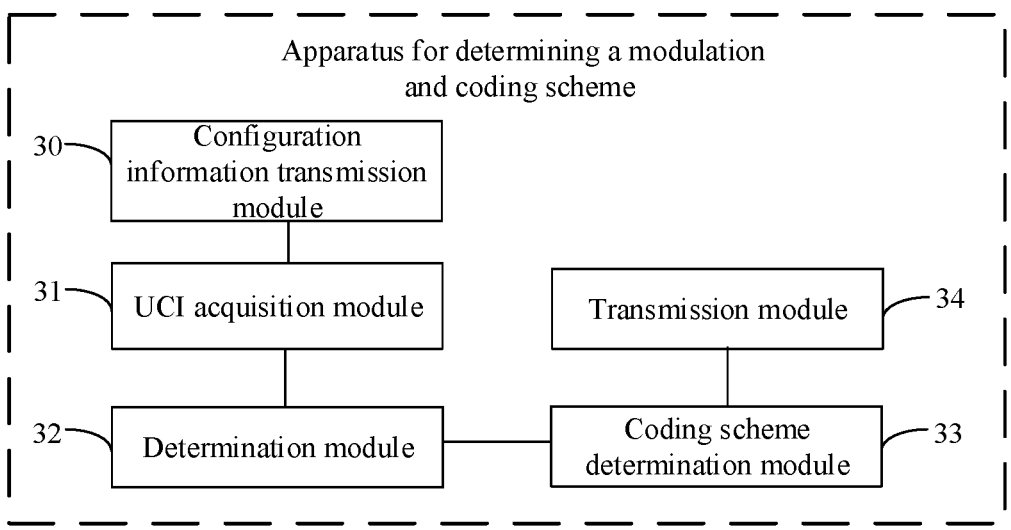
FIG. 10 is a block diagram illustrating another apparatus for determining a modulation and coding scheme according to an example of the present disclosure.

FIG. 10 is a block diagram illustrating another apparatus for determining a modulation and coding scheme according to an example. Based on the apparatus example shown in FIG. 9, the apparatus may further include:

a configuration information transmission module 30 configured to transmit CQI compression index configuration information to the UE, where the CQI compression index configuration information includes: the CQI compression index, the at least two modulation and coding schemes represented by each CQI compression index, and the CQI compression index representation manner corresponding to each modulation and coding scheme.

Figure 11:
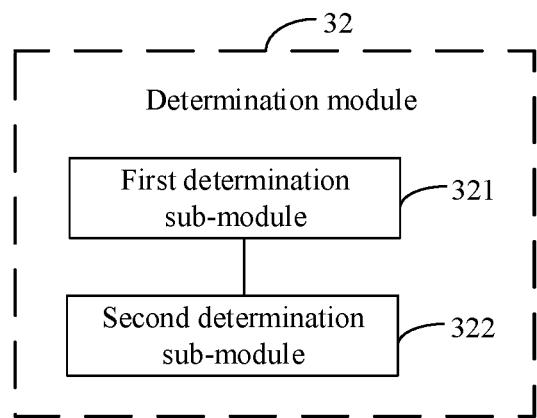
FIG. 11 is a block diagram illustrating another apparatus for determining a modulation and coding scheme according to an example of the present disclosure.

In another example of the present disclosure, the UCI acquired by the UCI acquisition module 31 further includes:

an equipment identifier of the UE. FIG. 11 is a block diagram illustrating another apparatus for determining a modulation and coding scheme according to an example. Based on the apparatus example shown in FIG. 9, the determination module 32 may include:

a first determination sub-module 321 configured to determine whether the UE supports a CQI index compression function according to the equipment identifier of the UE; and a second determination sub-module 322 configured to determine w whether the CQI index belongs to the CQI compression index according to the preset CQI compression index indication information when the UE supports the CQI index compression function.

Figure 12:
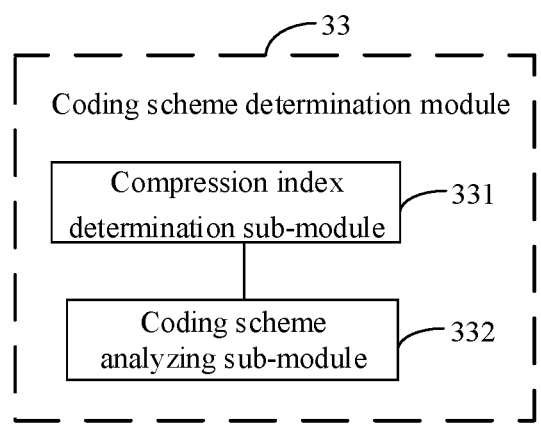
FIG. 12 is a block diagram illustrating another apparatus for determining a modulation and coding scheme according to an example of the present disclosure.

FIG. 12 is a block diagram illustrating another apparatus for determining a modulation and coding scheme according to an example. Based on the apparatus example shown in FIG. 9, the coding scheme determination module 33 may include: a compression index determination sub-module 331 configured to determine the CQI compression index, and a coding scheme analyzing sub-module 332 configured to analyze a modulation and coding scheme represented by the CQI index.

Figure 13:
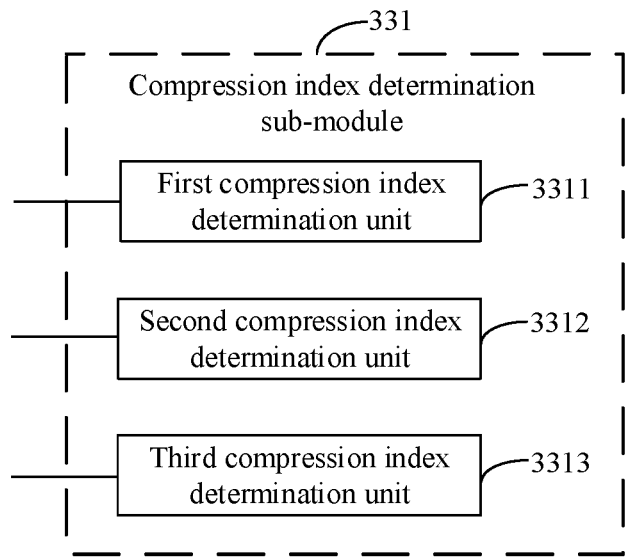
FIG. 13 is a block diagram illustrating another apparatus for determining a modulation and coding scheme according to an example of the present disclosure.

FIG. 13 is a block diagram illustrating another apparatus for determining a modulation and coding scheme according to an example. Based on the apparatus example shown in FIG. 12, the compression index determination sub-module 331 may include any of the following compression index determination units:

a first compression index determination unit 3311 configured to determine that the CQI index in the UCI belongs to the CQI compression index when the UCI received includes preset compression indication information;

a second compression index determination unit 3312 configured to determine that the CQI index in the UCI belongs to the CQI compression index when the UCI includes preset scrambled information; and a third compression index determination unit 3313 configured to determine that the CQI index in the UCI belongs to the CQI compression index when the UCI is received by using preset uplink time-frequency resources.

Figure 14:
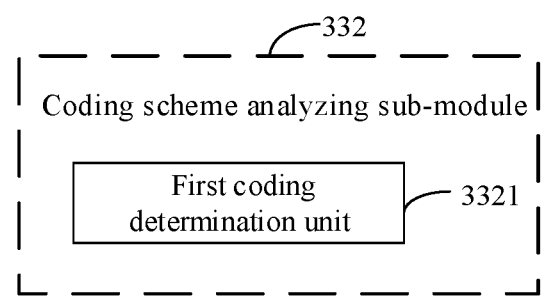
FIG. 14 is a block diagram illustrating another apparatus for determining a modulation and coding scheme according to an example of the present disclosure.

FIG. 14 is a block diagram illustrating another apparatus for determining a modulation and coding scheme according to an example. Based on the apparatus example shown in FIG. 13, the coding scheme analyzing sub-module 332 may include:

a first coding determination unit 3321 configured to determine the modulation and coding scheme represented by the CQI compression index according to a value of the compression indication information.

Figure 15:
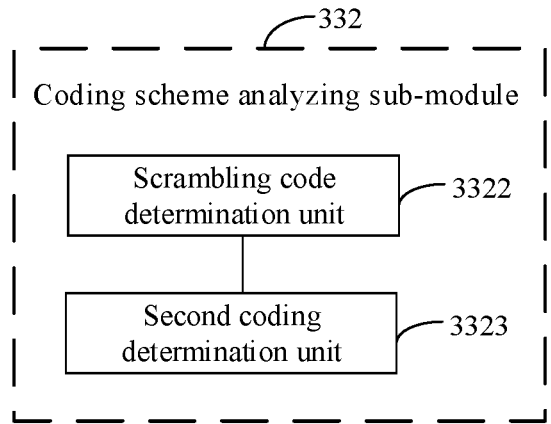
FIG. 15 is a block diagram illustrating another apparatus for determining a modulation and coding scheme according to an example of the present disclosure.

FIG. 15 is a block diagram illustrating another apparatus for determining a modulation and coding scheme according to an example. Based on the apparatus example shown in FIG. 13, the coding scheme analyzing sub-module 332 may include:

a scrambling code determination unit 3322 configured to descramble the scrambled information in the UCI according to a preset scrambling code to determine a target scrambling code and the CQI compression index; and a second coding determination unit 3323 configured to determine the modulation and coding scheme represented by the CQI compression index according to the target scrambling code.

Figure 16:
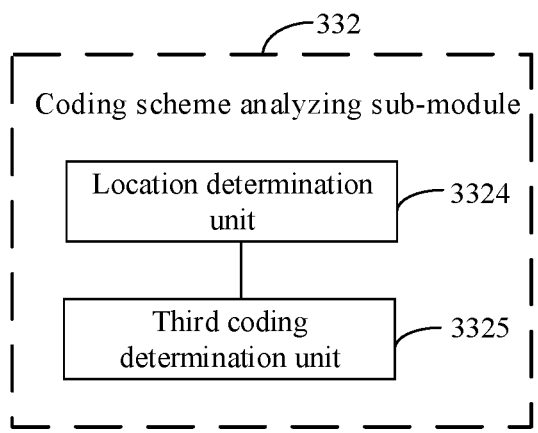
FIG. 16 is a block diagram illustrating an apparatus for determining a modulation and coding scheme according to an example of the present disclosure.

FIG. 16 is a block diagram illustrating another apparatus for determining a modulation and coding scheme according to an example. Based on the apparatus example shown in FIG. 13, the coding scheme analyzing sub-module 332 may include:

a location determination unit 3324 configured to determine a target time-frequency resource location for acquiring the UCI; and a third coding determination unit 3325 configured to determine the modulation and coding scheme represented by the CQI compression index according to the target time-frequency resource location.

Figure 17:
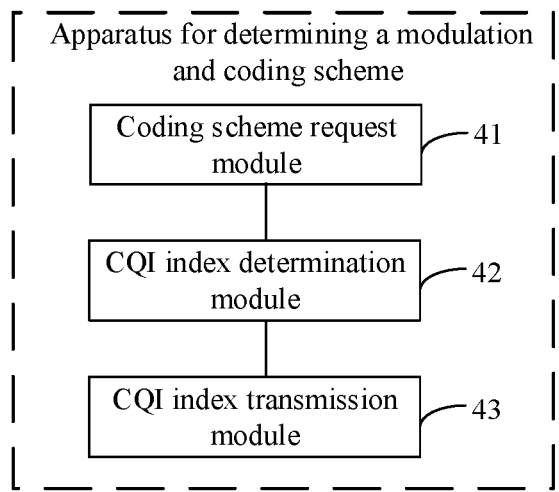
FIG. 17 is a block diagram illustrating another apparatus for determining a modulation and coding scheme according to an example of the present disclosure.

FIG. 17 is a block diagram illustrating an apparatus for determining a modulation and coding scheme according to an example, which is disposed in UE. The apparatus may include:

a coding scheme request module 41 configured to determine a to-be-requested modulation and coding scheme according to measured downlink channel quality;

a CQI index determination module 42 configured to query a preset CQI table according to the to-be-requested modulation and coding scheme to determine a target CQI index; and a CQI index transmission module 43 configured to transmit, when the target CQI index belongs to a CQI compression index representing at least two modulation and coding schemes, the CQI compression index to a base station with preset CQI compression index indication information, so that the base station configures a modulation and coding scheme for the UE according to the CQI compression index.

Figure 18:
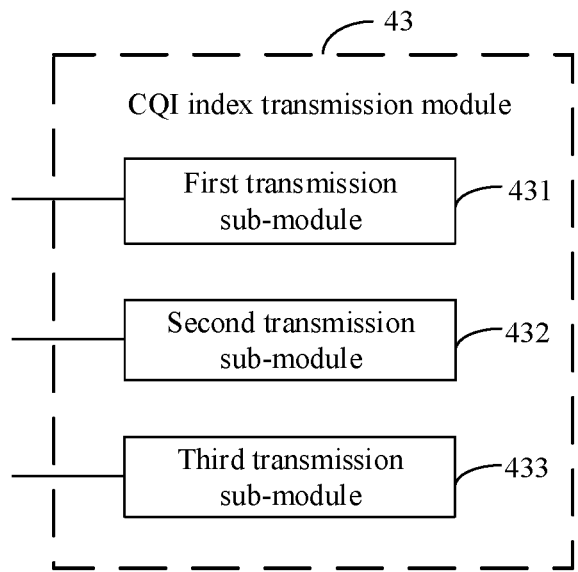
FIG. 18 is a block diagram illustrating another apparatus for determining a modulation and coding scheme according to an example of the present disclosure.

FIG. 18 is a block diagram illustrating another apparatus for determining a modulation and coding scheme according to an example. Based on the apparatus example shown in FIG. 17, the CQI index transmission module 43 may include:

a first transmission sub-module 431 configured to set a value of a reserved bit in UCI to a value corresponding to the to-be-requested modulation and coding scheme, and transmit the value to the base station;

a second transmission sub-module 432 configured to use a scrambling code corresponding to the to-be-requested modulation and coding scheme to scramble the UCI, and transmit the scrambled UCI to the base station; and a third transmission sub-module 433 configured to use a target uplink time-frequency resource specified for the to-be-requested modulation and coding scheme to transmit the UCI to the base station;

where the UCI includes the CQI compression index.

Figure 19:
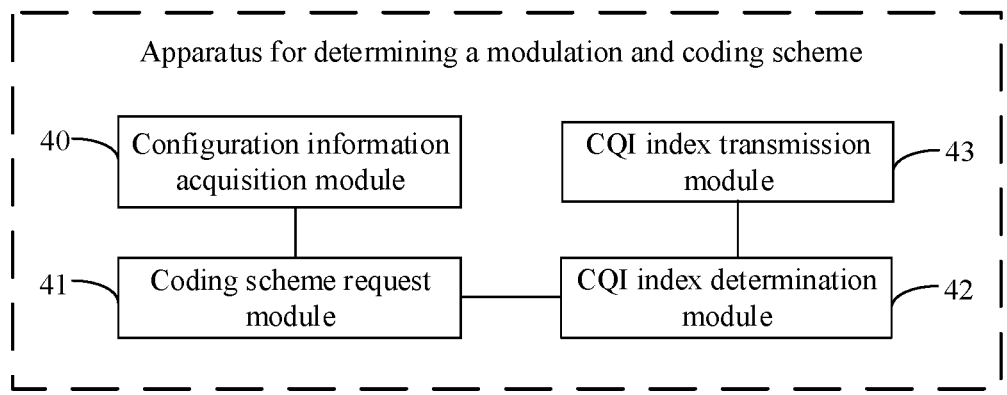
FIG. 19 is a block diagram illustrating another apparatus for determining a modulation and coding scheme according to an example of the present disclosure.

FIG. 19 is a block diagram illustrating another apparatus for determining a modulation and coding scheme according to an example. Based on the apparatus example shown in FIG. 17, the apparatus may further include:

a configuration information acquisition module 40 configured to acquire CQI compression index configuration information, where the CQI compression index configuration information includes: the CQI compression index, the at least two modulation and coding schemes represented by each CQI compression index, and a CQI compression index representation manner corresponding to each modulation and coding scheme.

Since the apparatus examples basically correspond to the method examples, reference may be made partially to the description of the method examples for relevant details. The apparatus examples described above are merely illustrative, where the units described as separate components may or may not be physically separated, and the components displayed as units may or may not be physical units, e.g., they may be located in one place or distributed to multiple nodes in a network. Some or all of the modules may be selected according to actual needs to achieve the objectives of the present disclosure. Those of ordinary skill in the art can understand and implement the examples without any creative effort.

Correspondingly, in one aspect, an apparatus for determining a modulation and coding scheme is provided, including:

a processor; and a memory for storing processor executable instructions; where the processor is configured to:

acquire UCI transmitted by UE, where the UCI includes at least a CQI index;

determine whether the CQI index belongs to a CQI compression index representing at least two modulation and coding schemes;

when the CQI index belongs to the CQI compression index, determine a modulation and coding scheme represented by the CQI compression index according to preset CQI compression index indication information; and determine modulation and coding configuration information for the UE according to the modulation and coding scheme, and transmit the modulation and coding configuration information to the UE;

where the preset CQI compression index indication information includes: a correspondence between the CQI compression index and the at least two modulation and coding schemes, and a CQI compression index representation manner corresponding to each modulation and coding scheme.

In another aspect, an apparatus for determining a modulation and coding scheme is provided, including:

a processor; and a memory for storing processor executable instructions; where the processor is configured to:

determine a to-be-requested modulation and coding scheme according to measured downlink channel quality;

query a preset CQI table according to the to-be-requested modulation and coding scheme to determine a target CQI index; and when the target CQI index belongs to a CQI compression index representing at least two modulation and coding schemes, transmit the CQI compression index to a base station with preset CQI compression index indication information, so that the base station configures a modulation and coding scheme for the UE according to the CQI compression index.

Figure 20:
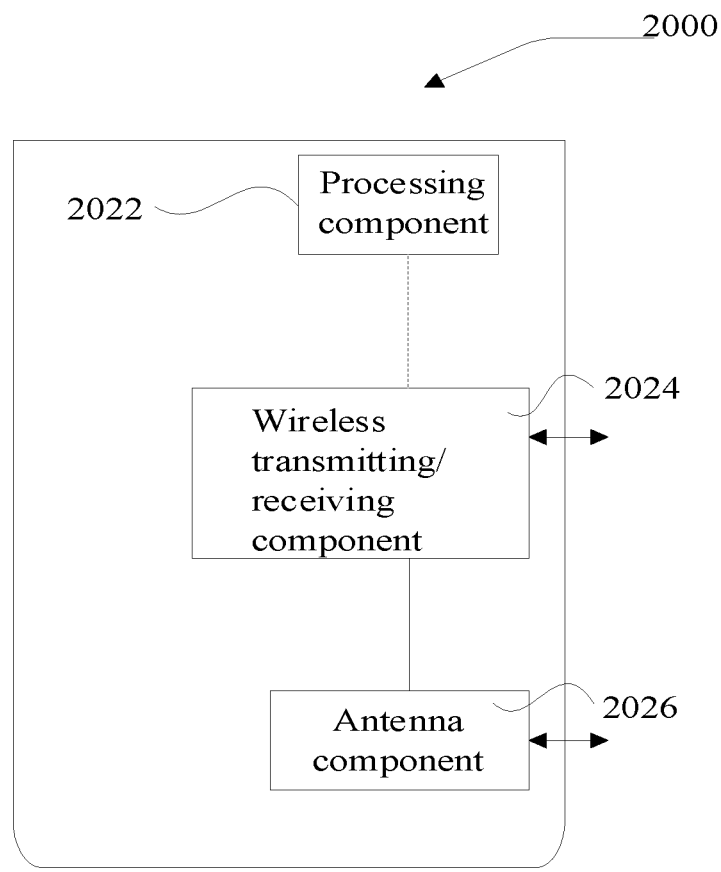
FIG. 20 is a structural diagram illustrating an apparatus for determining a modulation and coding scheme according to an example of the present disclosure.

FIG. 20 is a structural diagram illustrating an apparatus 2000 for determining a modulation and coding scheme according to an example. The apparatus 2000 may be provided to a base station. Referring to FIG. 20, the apparatus 2000 includes a processing component 2022, a wireless transmitting/receiving component 2024, an antenna component 2026, and a signal processing portion specific to a wireless interface. The processing component 2022 may further include one or more processors.

One of the processors in the processing component 2022 may be configured to:

acquire UCI transmitted by UE, where the UCI includes at least a CQI index;

determine whether the CQI index belongs to a CQI compression index representing at least two modulation and coding schemes;

when the CQI index belongs to the CQI compression index, determine a modulation and coding scheme represented by the CQI compression index according to preset CQI compression index indication information; and determine modulation and coding configuration information for the UE according to the modulation and coding scheme, and transmit the modulation and coding configuration information to the UE;

where the preset CQI compression index indication information includes: a correspondence between the CQI compression index and the at least two modulation and coding schemes, and a CQI compression index representation manner corresponding to each modulation and coding scheme.

In an example, there is also provided a non-transitory computer readable storage medium having computer instructions stored thereon, where the computer instructions are executable by the processing component 2022 of the apparatus 2000 to perform the methods of determining a modulation and coding scheme as described in any of FIGS. 1-6. For example, the non-transitory computer readable storage medium may be a ROM, a random-access memory (RAM), a CD-ROM, a magnetic tape, a floppy disk, and an optical data storage device.

Figure 21:
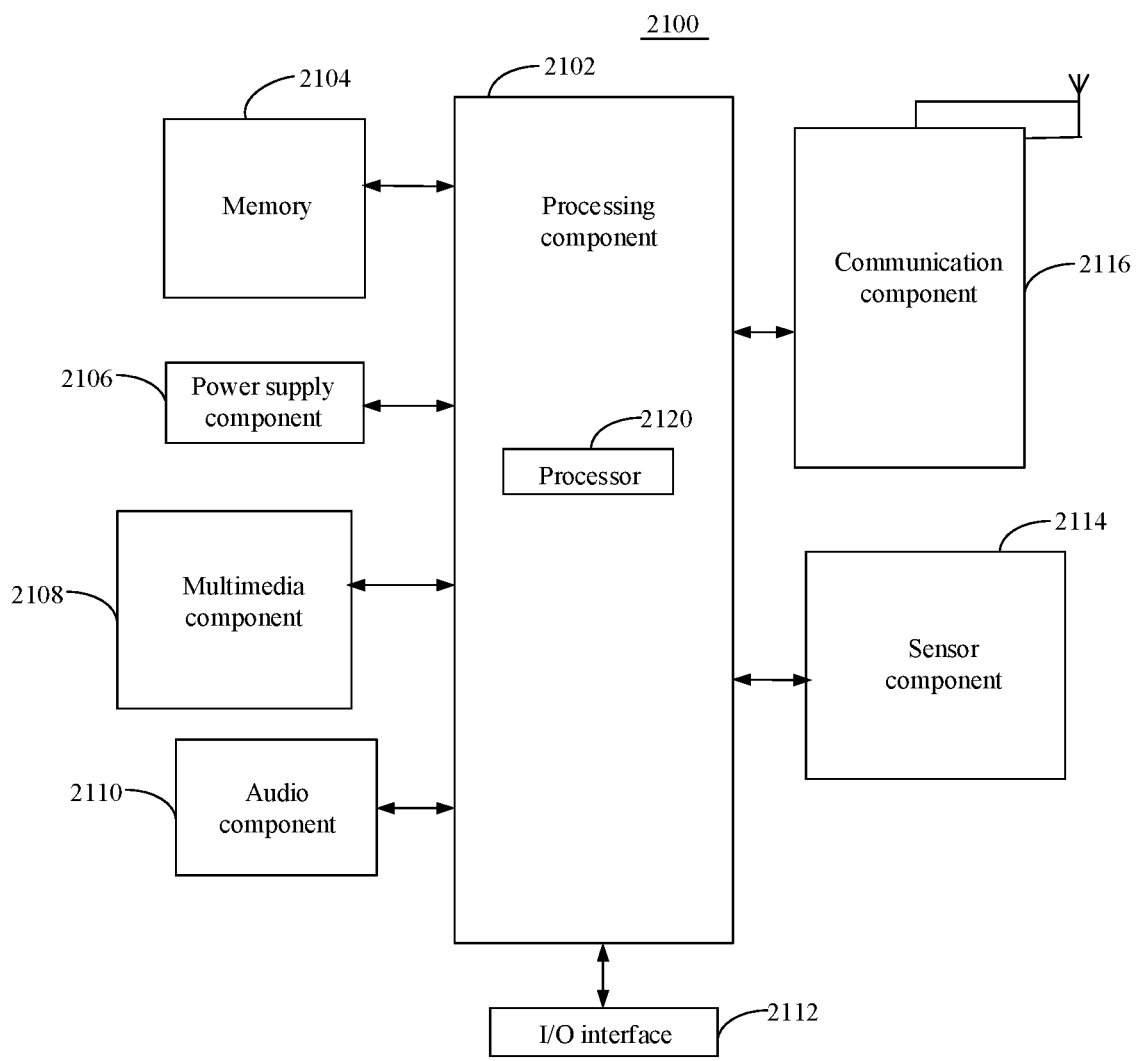
FIG. 21 is a structural diagram illustrating an apparatus for determining a modulation and coding scheme according to an example of the present disclosure.

FIG. 21 is a structural diagram illustrating an apparatus 2100 for determining a modulation and coding scheme according to an example. For example, the apparatus 2100 may be a terminal, and may specifically be a mobile phone, a computer, a digital broadcasting terminal, a message receiving and transmitting device, a game console, a tablet device, a medical device, a fitness device, a personal digital assistant, a wearable device such as a smart watch, smart glasses, a smart bracelet, smart running shoes, etc.

Referring to FIG. 21, the apparatus 2100 may include one or more of the following components: a processing component 2102, a memory 2104, a power supply component 2106, a multimedia component 2108, an audio component 2110, an input/output (I/O) interface 2112, a sensor component 2114, and a communication component 2116.

The processing component 2102 generally controls overall operations of the apparatus 2100, such as operations associated with display, phone calls, data communications, camera operations, and recording operations. The processing component 2102 may include one or more processors 2120 to execute instructions to complete all or part of the steps of the above methods. In addition, the processing component 2102 may include one or more modules which facilitate the interaction between the processing component 2102 and other components. For example, the processing component 2102 may include a multimedia module to facilitate the interaction between the multimedia component 2108 and the processing component 2102.

The memory 2104 is to store various types of data to support the operation of the apparatus 2100. Examples of such data include instructions for any application or method operated on the apparatus 2100, contact data, phonebook data, messages, pictures, videos, and so on. The memory 2104 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2106 provides power to different components of the apparatus 2100. The power supply component 2106 may include a power management system, one or more power supplies, and other components associated with generating, managing, and distributing power for the apparatus 2100.

The multimedia component 2108 includes a screen providing an output interface between the apparatus 2100 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 2108 may include a front camera and/or a rear camera. The front camera and/or rear camera may receive external multimedia data when the apparatus 2100 is in an operating mode, such as a photographing mode or a video mode. Each of the front camera and the rear camera may be a fixed optical lens system or have focal length and optical zooming capability.

The audio component 2110 is to output and/or input an audio signal. For example, the audio component 2110 includes a microphone (MIC). When the apparatus 2100 is in an operating mode, such as a call mode, a recording mode, and a voice recognition mode, the MIC is to receive an external audio signal. The received audio signal may be further stored in the memory 2104 or sent via the communication component 2116. In some examples, the audio component 2110 further includes a speaker to output an audio signal.

The I/O interface 2112 may provide an interface between the processing component 2102 and peripheral interface modules. The above peripheral interface modules may include a keyboard, a click wheel, buttons and so on. These buttons may include, but are not limited to, a home button, a volume button, a starting button and a locking button.

The sensor component 2114 includes one or more sensors to provide status assessments of various aspects for the apparatus 2100. For example, the sensor component 2114 may detect the on/off status of the apparatus 2100, and relative positioning of component, for example, the component is a display and a keypad of the apparatus 2100. The sensor component 2114 may also detect a change in position of the apparatus 2100 or a component of the apparatus 2100, a presence or absence of the contact between a user and the apparatus 2100, an orientation or an acceleration/deceleration of the apparatus 2100, and a change in temperature of the apparatus 2100. The sensor component 2114 may include a proximity sensor to detect the presence of a nearby object without any physical contact. The sensor component 2114 may further include an optical sensor, such as a Complementary Metal-Oxide-Semiconductor (CMOS) or Charged Coupled Device (CCD) image sensor which is used in imaging applications. In some examples, the sensor component 2114 may further include an acceleration sensor, a gyroscope sensor, a magnetic sensor, a pressure sensor, or a temperature sensor.

The communication component 2116 is to facilitate wired or wireless communication between the apparatus 2100 and other devices. The apparatus 2100 may access a wireless network that is based on a communication standard, such as Wi-Fi, 2G or 3G, or a combination thereof. In an example, the communication component 2116 receives a broadcast signal or broadcast-associated information from an external broadcast management system via a broadcast channel. In an example, the communication component 2116 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth® (BT) technology and other technologies.

In an example, the apparatus 2100 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is also provided a non-transitory computer readable storage medium including instructions, such as a memory 2104 including instructions, where the instructions are executable by the processor 2120 of the apparatus 2100 to perform the methods of determining the modulation and coding scheme as described above. For example, the non-transitory computer readable storage medium may be a ROM, a random-access memory (RAM), a CD-ROM, a magnetic tape, a floppy disk, and an optical data storage device.

Other embodiments of the present disclosure will be apparent to those skilled in the art after considering the specification and implementing the solutions disclosed herein. The present application is intended to encompass any variations, uses, or adaptations of the present disclosure, which variations, uses, or adaptations are in accordance with the general principles of the present disclosure and comprise common general knowledge or common technical means in the art which are not disclosed in the present disclosure. The specification and examples are to be regarded as illustrative only, the true scope and spirit of the present disclosure are expressed by the following claims.

It is to be understood that the present disclosure is not limited to the accurate structures already described above and expressed in the accompanying drawings, and is subject to modifications and variations without exceeding its scope. The scope of the present disclosure is to be limited only by the appended claims.

The invention claimed is:

1. A method of determining a modulation and coding scheme, applied to a base station, and comprising:
    acquiring uplink control information (UCI) transmitted by user equipment (UE), wherein the UCI comprises at least a channel quality indication (CQI) index;
    determining whether the CQI index belongs to a CQI compression index representing at least two modulation and coding schemes;
    when the CQI index belongs to the CQI compression index, determining a modulation and coding scheme represented by the CQI compression index according to preset CQI compression index indication information; and
    determining modulation and coding configuration information for the UE according to the modulation and coding scheme, and transmitting the modulation and coding configuration information to the UE;
    wherein the preset CQI compression index indication information comprises: a correspondence between the CQI compression index and the at least two modulation and coding schemes, and a CQI compression index representation manner corresponding to each modulation and coding scheme.

2. The method according to claim 1, wherein prior to the acquiring the UCI transmitted by the UE, the method further comprises:
    transmitting CQI compression index configuration information to the UE, wherein the CQI compression index configuration information comprises: the CQI compression index, the at least two modulation and coding schemes represented by each CQI compression index, and the CQI compression index representation manner corresponding to each modulation and coding scheme.

3. The method according to claim 1, wherein the UCI further comprises: an equipment identifier of the UE, and the determining whether the CQI index belongs to the CQI compression index representing the at least two modulation and coding schemes comprises:

determining whether the UE supports a CQI index compression function according to the equipment identifier of the UE; and when the UE supports the CQI index compression function, determining whether the CQI index belongs to the CQI compression index according to the preset CQI compression index indication information.

4. The method according to claim 1, wherein whether the CQI index belongs to the CQI compression index is determined in at least one of:

when the UCI received comprises preset compression indication information, determining that the CQI index in the UCI belongs to the CQI compression index;

when the UCI comprises preset scrambled information, determining that the CQI index in the UCI belongs to the CQI compression index; or when the UCI is received by using preset uplink time-frequency resources, determining that the CQI index in the UCI belongs to the CQI compression index.

5. The method according to claim 4, wherein the determining the modulation and coding scheme represented by the CQI compression index according to the preset CQI compression index indication information comprises:

determining the modulation and coding scheme represented by the CQI compression index according to a value of the compression indication information.

6. The method according to claim 4, wherein the determining the modulation and coding scheme represented by the CQI compression index according to the preset CQI compression index indication information comprises:

descrambling the scrambled information in the UCI according to a preset scrambling code to determine a target scrambling code and the CQI compression index; and determining the modulation and coding scheme represented by the CQI compression index according to the target scrambling code.

7. The method according to claim 4, wherein the determining the modulation and coding scheme represented by the CQI compression index according to the preset CQI compression index indication information comprises:

determining a target time-frequency resource location for acquiring the UCI;

determining the modulation and coding scheme represented by the CQI compression index according to the target time-frequency resource location; and allocating higher-order modulation and coding scheme including 1024 Quadrature Amplitude Modulation (QAM) and 2048 QAM for the UE, thereby improving data transmission throughput of a channel without adding a new CQI index or increasing computation amount.

8. A method of determining a modulation and coding scheme, applied to a user equipment (UE), and comprising:

determining a to-be-requested modulation and coding scheme according to measured downlink channel quality;

querying a preset channel quality indication (CQI) table according to the to-be-requested modulation and coding scheme to determine a target CQI index; and when the target CQI index belongs to a CQI compression index representing at least two modulation and coding schemes, transmitting the CQI compression index to a base station with preset CQI compression index indication information, so that the base station configures a modulation and coding scheme for the UE according to the CQI compression index.

9. The method according to claim 8, wherein the CQI compression index is transmitted to the base station with the preset CQI compression index indication information in at least one of:

setting a value of a reserved bit in uplink control information (UCI) to a value corresponding to the to-be-requested modulation and coding scheme, and transmitting the value to the base station;

using a scrambling code corresponding to the to-be-requested modulation and coding scheme to scramble the UCI, and transmitting the scrambled UCI to the base station; or using a target uplink time-frequency resource specified for the to-be-requested modulation and coding scheme to transmit the UCI to the base station;

wherein the UCI comprises the CQI compression index.

10. The method according to claim 8, further comprising:

acquiring CQI compression index configuration information including: the CQI compression index, the at least two modulation and coding schemes represented by each CQI compression index, and a CQI compression index representation manner corresponding to each modulation and coding scheme.

11. An apparatus for determining a modulation and coding scheme, comprising:

a processor; and a memory storing instructions for execution by the processor;

wherein the processor is configured to:

acquire uplink control information (UCI) transmitted by user equipment (UE), wherein the UCI comprises at least a channel quality indication (CQI) index;

determine whether the CQI index belongs to a CQI compression index representing at least two modulation and coding schemes;

when the CQI index belongs to the CQI compression index, determine a modulation and coding scheme represented by the CQI compression index according to preset CQI compression index indication information; and determine modulation and coding configuration information for the UE according to the modulation and coding scheme, and transmit the modulation and coding configuration information to the UE;

wherein the preset CQI compression index indication information comprises: a correspondence between the CQI compression index and the at least two modulation and coding schemes, and a CQI compression index representation manner corresponding to each modulation and coding scheme.

12. The apparatus according to claim 11, wherein prior to the acquiring the UCI transmitted by the UE, the method further comprises:

transmitting CQI compression index configuration information to the UE,
wherein the CQI compression index configuration information comprises: the CQI compression index, the at least two modulation and coding schemes represented by each CQI compression index, and the CQI compression index representation manner corresponding to each modulation and coding scheme.

13. The apparatus according to claim 11, wherein
the UCI further comprises: an equipment identifier of the UE, and
determining whether the CQI index belongs to the CQI compression index representing the at least two modulation and coding schemes comprises:
determining whether the UE supports a CQI index compression function according to the equipment identifier of the UE; and
when the UE supports the CQI index compression function, determining whether the CQI index belongs to the CQI compression index according to the preset CQI compression index indication information.

14. The apparatus according to claim 11, wherein whether the CQI index belongs to the CQI compression index is determined in at least one of:
when the UCI received comprises preset compression indication information, determining that the CQI index in the UCI belongs to the CQI compression index;
when the UCI comprises preset scrambled information, determining that the CQI index in the UCI belongs to the CQI compression index; or
when the UCI is received by using preset uplink time-frequency resources, determining that the CQI index in the UCI belongs to the CQI compression index.

15. The apparatus according to claim 14, wherein the determining the modulation and coding scheme represented by the CQI compression index according to the preset CQI compression index indication information comprises:
determining the modulation and coding scheme represented by the CQI compression index according to a value of the compression indication information.

16. The apparatus according to claim 14, wherein the determining the modulation and coding scheme represented by the CQI compression index according to the preset CQI compression index indication information comprises:
descrambling the scrambled information in the UCI according to a preset scrambling code to determine a target scrambling code and the CQI compression index; and
determining the modulation and coding scheme represented by the CQI compression index according to the target scrambling code.

17. The apparatus according to claim 11, wherein the determining the modulation and coding scheme represented by the CQI compression index according to the preset CQI compression index indication information comprises:
determining a target time-frequency resource location for acquiring the UCI; and
determining the modulation and coding scheme represented by the CQI compression index according to the target time-frequency resource location.

18. An apparatus for determining a modulation and coding scheme, comprising:
a processor; and
a memory storing instructions for execution by the processor;
wherein the processor is configured to:
determine a to-be-requested modulation and coding scheme according to measured downlink channel quality;
query a preset CQI table according to the to-be-requested modulation and coding scheme to determine a target CQI index; and
when the target CQI index belongs to a CQI compression index representing at least two modulation and coding schemes, transmit the CQI compression index to a base station with preset CQI compression index indication information, so that the base station configures a modulation and coding scheme for the UE according to the CQI compression index.

19. The apparatus according to claim 18, wherein the CQI compression index is transmitted to the base station with the preset CQI compression index indication information in at least one of:
setting a value of a reserved bit in UCI to a value corresponding to the to-be-requested modulation and coding scheme, and transmitting the value to the base station;
using a scrambling code corresponding to the to-be-requested modulation and coding scheme to scramble the UCI, and transmitting the scrambled UCI to the base station; or
using a target uplink time-frequency resource specified for the to-be-requested modulation and coding scheme to transmit the UCI to the base station;
wherein the UCI comprises the CQI compression index.

20. The apparatus according to claim 18, wherein the processor is further configured to: acquire CQI compression index configuration information, wherein the CQI compression index configuration information comprises: the CQI compression index, the at least two modulation and coding schemes represented by each CQI compression index, and a CQI compression index representation manner corresponding to each modulation and coding scheme.

* * * * *